United States Patent [19]

Takei

[11] Patent Number: 4,916,963

[45] Date of Patent: Apr. 17, 1990

[54] MOVING TABLE UNIT

[75] Inventor: Seiji Takei, Yokohama, Japan

[73] Assignee: Nippon Thompson Co., Ltd., Tokyo, Japan

[21] Appl. No.: 223,415

[22] Filed: Jul. 25, 1988

[30] Foreign Application Priority Data

Oct. 3, 1987 [JP] Japan ............................. 62-151841

[51] Int. Cl.$^4$ ............................................. F16H 25/22
[52] U.S. Cl. ................................ 74/424.8 B; 74/89.15; 74/424.8 R
[58] Field of Search ......... 74/89.15, 424.8 R, 424.8 B

[56] References Cited

U.S. PATENT DOCUMENTS

| | | | |
|---|---|---|---|
| 2,630,022 | 3/1953 | Terdina | 74/424.8 B |
| 2,860,266 | 11/1958 | Schrader | 74/424.8 B X |
| 4,614,128 | 9/1986 | Fickler | 74/424.8 R |
| 4,693,131 | 9/1987 | Teramachi | 74/424.8 B |

*Primary Examiner*—Allan D. Herrmann
*Attorney, Agent, or Firm*—Vaden, Eickenroht, Thompson & Boulware

[57] ABSTRACT

There is provided a moving table unit having a table which is attached to rectilinear guide devices on both sides of the legs of a substantially U-shaped bed, a first motor unit with a ball screw which is attached to the upper side of the bottom of the bed near an end of the bed in the sliding direction of the bed; a second motor unit with a ball screw which is attached to the lower side of the table near one end of the table; and a ball spline unit attached to the lower side of the table between the motor units and near the other end of the table, wherein these units have the same axial center and are coaxially coupled by a drive shaft on which ball screw grooves and a ball spline groove are formed at the positions corresponding to those units. The outer diameter of the portion of the ball spline shaft on which the ball spline groove is formed is larger than those of the drive shaft on which the ball screw grooves are formed. With this table unit, no backlash occurs, the high positioning accuracy is derived, the rigidity of the drive apparatus of the table unit is increased. The table unit can be miniaturized and cheaply manufactured.

2 Claims, 3 Drawing Sheets

MOVING TABLE UNIT

BACKGROUND OF THE INVENTION

1. Field of the Invention

The present invention relates to a moving table unit in which a table is attached to a rectilinear motion guide device on each of both side legs of a substantially U-shaped bed thereby relatively rectilinearly moving the table and bed. More particularly, the invention relates to a moving table unit which can freely set the moving velocity and movement amount of the table.

2. Description of the Prior Art

According to a conventional moving table unit, for example, ball screw grooves having different pitches are formed on a single shaft, nuts for ball screws corresponding to the ball screw grooves are fitted therein, one of the nuts is rotatably fixed to a table, the other nut is rotatably fixed to a bed, these nuts are simultaneously or independently rotated, and thereby feeding the table and bed finely or at a high speed due to the difference between the screw pitches or the like. In this case, however, since apparatuses (e.g., a gear, a motor, etc.) to drive the nut of the ball screw are separately attached, the size of the moving table itself is large and the number of parts is also large. Thus, the conventional moving table unit is expensive.

In addition, since the driving force of the motor is indirectly propagated by gear, belt drive, or the like, a backlash occurs and the accurate positioning cannot be performed.

SUMMARY OF THE INVENTION

It is an object of the present invention to solve the foregoing problems and to provide a cheap moving table unit which can move at a high running accuracy and can also continuously accurately feed a table finely or at a high speed.

According to the invention, this object is accomplished by a moving table unit having a substantially U-shaped bed and a table which is slidably attached to the bed through rectilinear guide devices on the legs of the bed: a first motor unit with a ball screw which is attached to the upper side of the bottom of the bed intermediate its legs and below the table; a second motor unit with a ball screw attached to the lower side of the table; and a ball spline unit attached to the lower side of the table between those two motor units. In this moving table unit, the axial centers of the ball screws of the first and second motor units and the ball spline unit are the same and these units are coaxially coupled by a drive shaft on which ball screw grooves and a ball spline groove are formed at the positions corresponding to those motor units.

An outer diameter of the portion of the shaft on which the ball spline groove is formed is larger than those portions of the drive shaft on which the ball screw grooves of the first and second motor units are formed.

With the foregoing structure, the present invention has the following advantages.

(1) Since the motor units with the ball screws are used, no backlash occurs and the high positioning accuracy is derived.

(2) Since the ball spline unit is arranged between the motor units with the ball screws, the rigidity of the driving apparatus itself of the moving table can be increased.

(3) The whole moving table unit can be miniaturized.

(4) Since the number of parts can be reduced, the moving table unit can be cheaply manufactured.

The above and other objects and features of the present invention will become apparent from the following detailed description and the appended claims with reference to the accompanying drawings.

BRIEF DESCRIPTION OF THE DRAWINGS

FIG. 1 is a front view showing a whole system;

FIG. 2 is a front view showing a second motor unit with a ball screw;

FIG. 3 is a front view showing a ball spline unit;

FIG. 4 is a side elevational view of FIG. 1 when it is seen from the side of the second motor unit with the ball screw.

DESCRIPTION OF THE PREFERRED EMBODIMENTS

Embodiments of the present invention will be described in detail hereinbelow with reference to the drawings.

Figure 1:
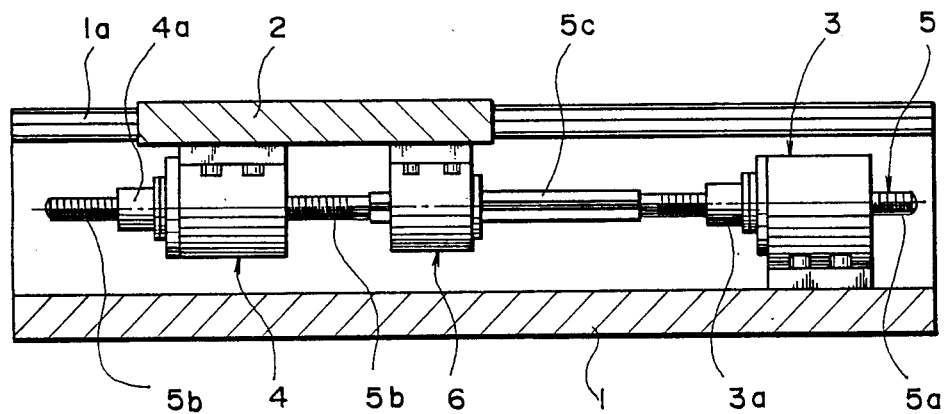
FIGS. 1 to 4 show the first embodiment of the present invention.
Figure 2:
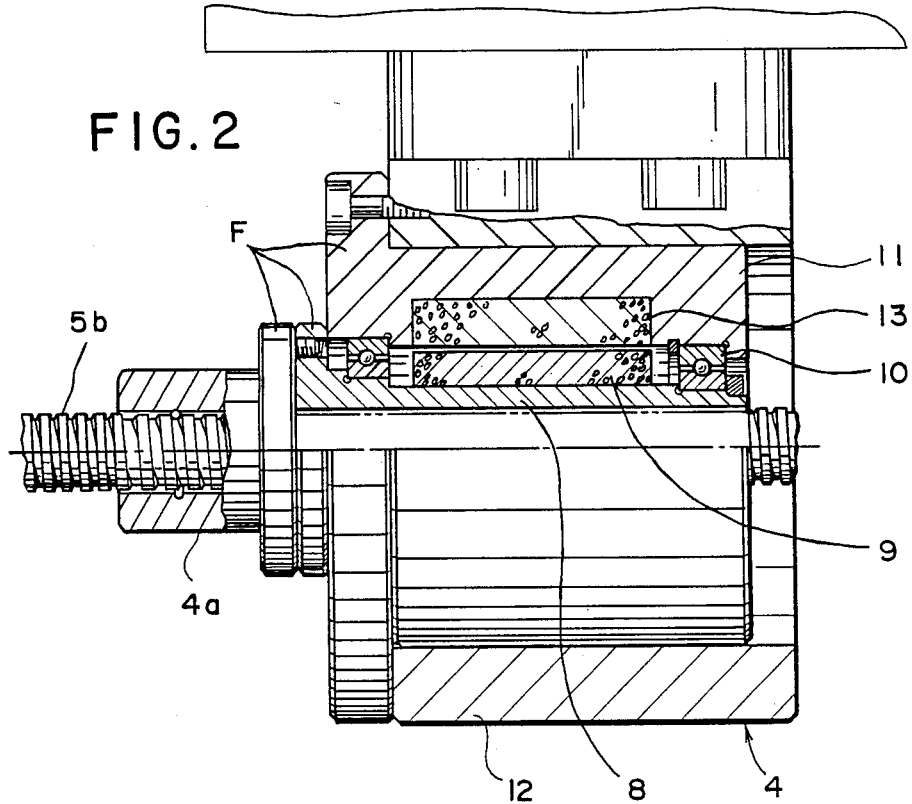
Figure 3:
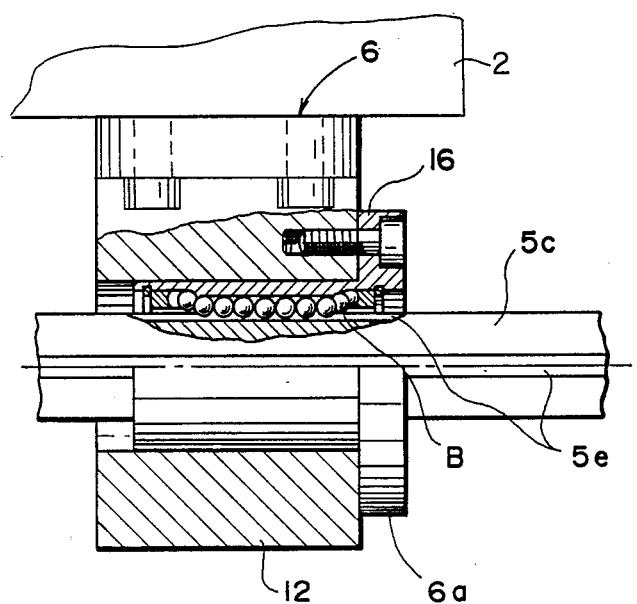
Figure 4:
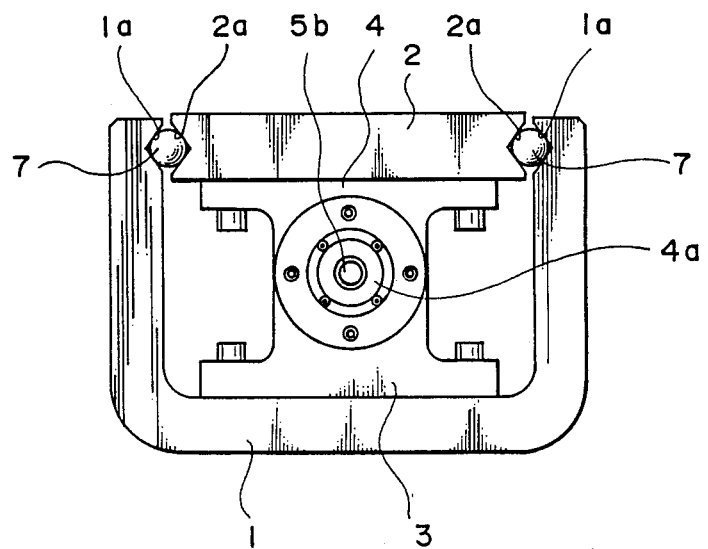
Figure 5:
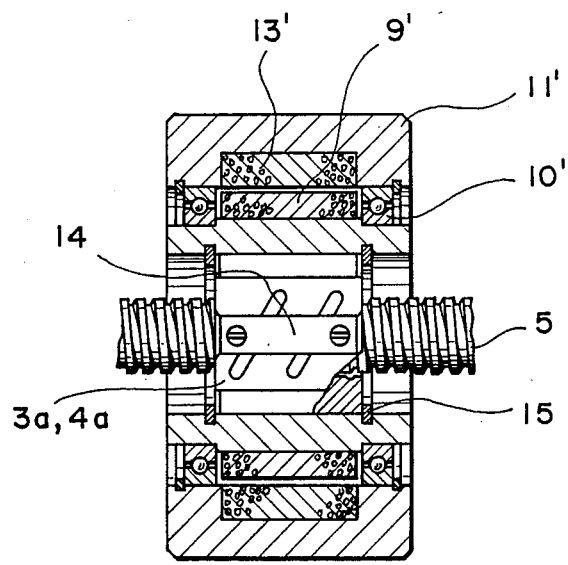
FIG. 5 shows the second embodiment of a motor unit with a ball screw.

FIGS. 1 to 4 show the first embodiment of the invention. FIG. 1 is a front view showing a whole system. FIG. 2 is a front view showing a second motor unit with a ball screw. FIG. 3 is a front view showing a ball spline unit. FIG. 4 is a side elevational view of FIG. 1 when it is seen from the side of the second motor unit with the ball screw. FIG. 5 shows the second embodiment of a motor unit with a ball screw.

FIG. 1 is a diagram showing a whole moving table unit according to the first embodiment of the invention. Track grooves 1a are formed on the inside wall surfaces of the legs of a substantially U-shaped bed 1 elongated in the longitudinal direction. Track grooves 2a are formed on both edge surfaces of a plate-shaped table 2 so as to be elongated in the longitudinal direction in correspondence to the track grooves 1a formed in the bed 1. A number of balls 7 are fitted between the opposite track grooves 1a and 2a. The table 2 is inserted between the track grooves 1a of the bed 1 through the balls 7. The bed 1 and table 2 are relatively slidably assembled, thereby constructing the moving table unit.

A second motor unit 4 with a ball screw is attached to the lower side of the table 2, i.e., near the left end thereof in the sliding direction. A ball spline unit 6 having the same axial center as ball screw of the motor unit 4 is attached to the lower side of the table. A first motor unit 3 with a ball screw having the same axial center as the second motor unit 4 is attached to the upper portion of the table on the other side of the ball spline unit from the attaching position of the motor unit 4.

Further, a drive shaft 5 is coaxially fitted into the first and second motor units 3 and 4 and the ball spline unit 6.

Ball screw shafts 5a and 5b and a ball spline shaft 5c are formed on the drive shaft 5 in correspondence to those units. An outer diameter of the ball spline shaft 5c on which the ball spline groove is formed is larger than those portions of the ball screw shafts 5a and 5b at both ends on which the ball screw grooves are formed, thereby increasing the rigidity of the drive shaft 5 and enabling the shaft to be easily machined.

On the other hand, obviously, a screw lead (e.g., 5 mm) of the first ball screw shaft 5a is different from a screw lead (e.g., 4.9 mm) of the second ball screw shaft 5b.

FIG. 2 shows the second motor unit with a ball screw. The structure shown in FIG. 2 is substantially the same as that of the first motor unit 3 except the leads of the ball screws and the position of the housing.

A ball screw nut 4a (similar to the ball screw nut 3a of the first unit) surrounds and is engaged with ball screw shaft portion 5b by means of balls (not shown). The nut 4a is mounted on a wheel 8 surrounding the shaft portion by means of flanges F bolted to one another. The wheel is carried for rotation within an outer cylinder 11 by means of bearings 10, and the outer cylinder is carried by and mounted on a housing 12 by means of a flange bolted to the end of the housing. A flange on the housing 12 is bolted to the lower side of the table. The rotor is driven so as to rotate the wheel and thus the nut through windings W disposed between the rotor and stator.

FIG. 3 shows the ball spline nut 6. The well-known ball spline 6 is fixedly fitted into the housing 12 and is come into engagement with the ball spline shaft portion 5c through the balls, thereby preventing the drive shaft 5 from being rotated and supporting the shaft.

FIG. 4 is a side elevational view of FIG. 1 when the moving table unit is seen from the side of the second motor unit with the ball screw. Examples of structures and shapes of the bed 1, table 2, and balls 7 are merely illustrated when they are used in a rectilinear guide device. Various kinds of structures have already been known in addition to the foregoing technique. These other techniques can be also used.

FIG. 5 shows the second embodiment of a motor unit with a ball screw. In the first embodiment, the ball screw nut 4a and the motor portion have been arranged serially in the axial direction. However, in the second embodiment, they are arranged in parallel at the inner and outer positions, thereby miniaturizing the motor unit in the axial direction.

With this structure, for instance, when ball screw nuts 3a and 4a of the first and second motor units 3 and 4 are respectively rotated once in the same direction, the table 2 can be finely moved by only the distance corresponding to the difference (0.1 mm=5 mm−4.9 mm) between the leads of the ball screws. If the nuts are rotated once in the opposite directions, the table 2 can be fed at a high speed by the distance of only the sum (9.9 mm=5 mm+4.9 mm) of the leads of the screws.

On the other hand, if the motor as a drive apparatus is constituted like a stepping motor which can freely set a rotational angle of the shaft, the feeding amount can be freely continuously set from the fine feed to the high-speed feed. Moreover, since the ball screw nuts are directly coupled with the motor, no backlash occurs, the high rectilinear moving accuracy and the high positioning accuracy can be derived.

The present invention is not limited to the foregoing embodiments but many modifications and variations are possible within the spirit and scope of the appended claims of the invention.

What is claimed is:

1. A moving table unit having
   a substantially U-shaped bed,
   a table which is slidably attached to the bed through rectilinear guide devices on the legs of the bed,
   a first motor unit with a ball screw which is attached to the upper side of the bottom of the bed,
   a second motor unit with a ball screw which is attached to the lower side of the table; and
   a ball spline unit which is attached to either the lower side of the table or the upper side of the bottom of the bed between said first and second motor units, and
   wherein the ball screws of the first and second motor units and the ball spline unit have the same axial center and are coaxially coupled by a drive shaft on which ball screw grooves and a ball spline groove are formed at the positions corresponding to said units.

2. A moving table unit according to claim 1, wherein an outer diameter of the portion of the shaft on which the ball spline groove is formed is larger than those positions of the shaft on which the ball screw grooves for said first and second motor units are formed.

* * * * *